United States Patent
Tangvald et al.

(10) Patent No.: US 7,562,264 B2
(45) Date of Patent: Jul. 14, 2009

(54) FAULT TOLERANT SOFT ERROR DETECTION FOR STORAGE SUBSYSTEMS

(75) Inventors: Matthew B. Tangvald, Portland, OR (US); Morgan Dempsey, Phoenix, AZ (US); Scott T. Peiffer, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 402 days.

(21) Appl. No.: 11/516,909

(22) Filed: Sep. 6, 2006

(65) Prior Publication Data

US 2008/0126885 A1     May 29, 2008

(51) Int. Cl.
*G06F 11/00*     (2006.01)
(52) U.S. Cl. ........................................ 714/49
(58) Field of Classification Search ..................... 714/49
See application file for complete search history.

(56) References Cited

U.S. PATENT DOCUMENTS

| | | | | |
|---|---|---|---|---|
| 4,363,125 A * | 12/1982 | Brewer et al. | .............. | 714/824 |
| 5,477,552 A * | 12/1995 | Nishiyama | .............. | 714/770 |
| 6,205,521 B1 * | 3/2001 | Schumann | .............. | 711/144 |
| 6,512,644 B1 * | 1/2003 | Hall et al. | .............. | 360/31 |
| 2003/0041201 A1 * | 2/2003 | Rauscher | .............. | 710/300 |
| 2003/0123175 A1 * | 7/2003 | Gill et al. | .............. | 360/53 |
| 2004/0044705 A1 * | 3/2004 | Stager et al. | .............. | 707/204 |
| 2006/0015537 A1 * | 1/2006 | Marks | .............. | 707/200 |

* cited by examiner

*Primary Examiner*—Scott T Baderman
*Assistant Examiner*—Yair Leibovich
(74) *Attorney, Agent, or Firm*—Christopher K. Gagne (57) ABSTRACT

A method and apparatus for detecting soft errors in a storage subsystem is provided. Write data generated for a write operation in a first controller is concurrently generated in a second controller and written to a storage device by the first controller. Soft errors are detected by comparing the two sets of write data by comparing respective checksums or the write data read back from the storage device by the second controller.

24 Claims, 8 Drawing Sheets

FAULT TOLERANT SOFT ERROR DETECTION FOR STORAGE SUBSYSTEMS

FIELD

This disclosure relates to storage subsystems and in particular to detecting soft errors in data transferred to storage devices.

BACKGROUND

Currently, there are several industry standard, commonly available, solutions for providing fault tolerance access to storage devices. Typically, protection schemes address hard disk drive failures, with the most common being Redundant Array of Independent Disks (RAID).

An Input/Output (I/O) controller in a computer system typically controls access to peripheral devices such as storage devices. To protect against a hardware failure of an I/O controller, a computer system may include two physically separate independent servers, each having an I/O controller that may be connected to an array of storage devices such as disk drives. The servers are clustered together at the operating system level (commonly referred to as clustering) and are coupled through a communication link which may use the Ethernet protocol. The communication link allows one server to detect a failure in the other server which may be due to a hardware failure. In the event of a hardware failure or other failure, for example, due to a software error resulting in operating system crash, the other server detects the failure and takes the place of the failed server.

Hardware protection of an I/O controller may also be provided in a single storage enclosure which may include two independent I/O controllers connected to an array of disk drives. The storage enclosure that includes the two I/O controllers is separate from the servers. There is a direct communications link between the I/O controllers, and if one I/O controller fails due to either a hardware or firmware (software routines stored in read only memory (ROM)) error, the surviving controller takes over. This is commonly referred to as failover and may be implemented in an active/active mode or active/passive mode. In the active/active mode, both I/O controllers work independently on separate data sets until one I/O controller fails. After the one I/O controller fails, the surviving I/O controller manages both data sets. In active/passive mode, one I/O controller operates in a monitoring only capacity until the other I/O controller fails.

These configurations protect against failure of an I/O controller or a server and when used in conjunction with RAID may also provide protection against disk drive failures. However, neither RAID, clustering or active/passive I/O controllers protect against silent data corruption due to soft errors that may occur within an I/O controller.

Soft errors involve changes to data and may be caused by random noise or signal integrity problems. Soft errors may occur in transmission lines, in logic, in magnetic storage or in semiconductor storage and may be due to cosmic events in which alpha particles result in random memory bits changing state from '0' to '1' or '1' to '0' that may result in an operating system crash. A soft error does not damage hardware; the only damage is to the data that is being processed. In many cases I/O controllers cannot detect if a soft error occurs while processing the data within the I/O controller. As such, silent data corruption can happen, resulting in incorrect data being written to storage devices. When silent data corruption occurs in a fault tolerant RAID configuration, the value of RAID is negated, as the volume contains corrupt data.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
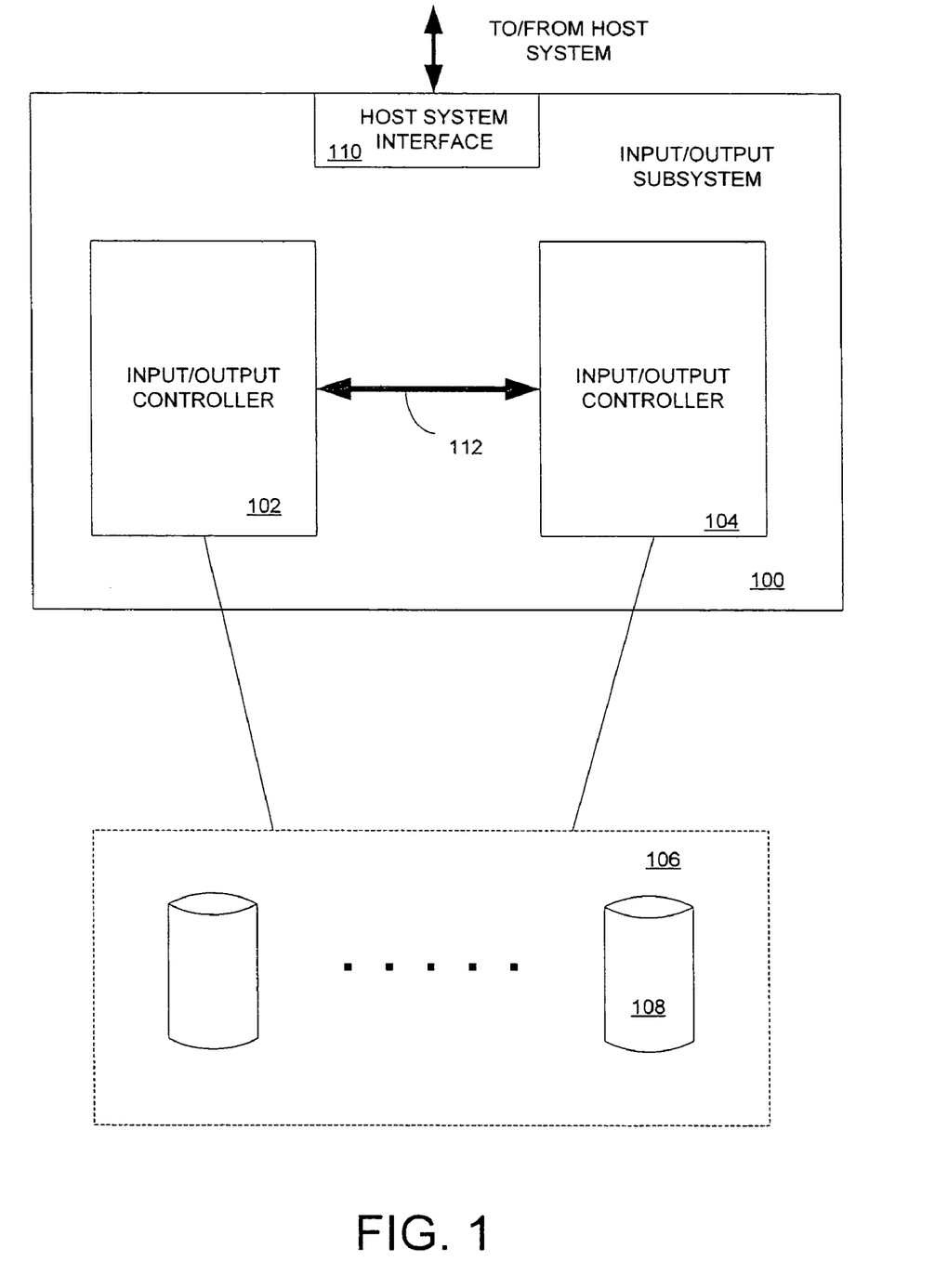
FIG. 1 is a block diagram of an embodiment of an I/O subsystem having two independent Input/Output controllers.

FIG. 1 is a block diagram of an embodiment of an I/O subsystem (storage enclosure) 100 having two independent Input/Output (I/O) controllers 102, 104. An I/O controller 102, 104 includes circuitry that monitors operations and performs tasks related to receiving input and transferring output at an input or output device or port. For example, an I/O device may be a keyboard, mouse, monitor or storage device such as a disk drive. The I/O controller 102, 104 provides a consistent means of communication (input/output interface) with the I/O device and also frees a host coupled to the I/O subsystem 100 for other work.

In the embodiment shown, each of the I/O controllers 102, 104 is coupled to a shared pool of storage devices 106. In another embodiment, the I/O controllers 102, 104 may be coupled to a single storage device 108. Protection against hardware failures in the I/O controllers 102, 104 is provided by allowing the two I/O controllers 102, 104 to access the shared pool of storage devices 106. The storage devices 108 coupled to the I/O controllers 102, 104 may be a disk drive such as, a hard disk drive or a floppy disk drive, Digital Video Disk (DVD) drive, compact disk (CD) drive, Redundant Array of Independent Disks (RAID), or tape drive. An embodiment of the storage system 100 may be a RAID, Internet Small Computer Systems Interface (iSCSI) or ATA over Ethernet (AoE) target, Archive or Virtual Tape library (VTL).

In an embodiment, the storage devices 108 are hard disk drives that communicate with the I/O controllers 102, 104 using the Serial Attached Small Computer System Interface (SAS) protocol. A version of the SAS-Serial Storage Protocol (SSP) is described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by ANSI.

However, the invention is not limited to SAS-SSP. An embodiment of the invention may also be used for other serial storage protocols such as Fibre Channel. A version of the Fibre Channel (FC) standard is described in the American National Standards Institute (ANSI) Standard Fibre Channel Physical and Signaling Interface-2 (FC-FS-2) Aug. 9, 2005 Specification. A version of the Fibre Channel Protocol (FCP-3) standard which defines a mapping protocol for applying the Small Computer System Interface (SCSI) command set to Fibre Channel is described in Information technology—Fibre Channel Protocol for SCSI, Third Version (FCP-3) Revision 4, Sep. 13, 2005 American National Standards Institute (ANSI)".

An embodiment of the invention may also be used for I/O controllers that support other communication protocols such as Infiniband, Ethernet, Peripheral Component Interconnect-express (PCIe), Internet Small Computer System Interface (iSCSI) and parallel Small Computer System Interface (SCSI). The I/O subsystem 100 is separate from a host system which may be coupled to the I/O subsystem 100 through a host system interface 110 that supports a communications protocol such as Ethernet or Fibre Channel. The I/O controllers 102, 104 also have a separate dedicated inter-controller communications path 112 that allows direct communication between the I/O controllers 102, 104. The inter-controller communications path 112 may use Peripheral Component Interconnect-express (PCI-e), Intelligent Input/Output (I2O), Serial Advanced Technology Attachment (SATA), Universal Serial Bus (USB), SAS protocol or any other communications protocol. A version of the SATA protocol is described in "Serial ATA: High Speed Serialized AT Attachment," Revision 1.0a, published on Jan. 7, 2003 by the Serial ATA Working Group.

The I/O controllers 102, 104 may operate in active-active mode or active-passive mode. In active-active mode, both I/O controllers 102, 104 work independently on separate data sets. If one I/O controller 102, 104 fails, the surviving I/O controller manages all data sets. In active-passive mode, one I/O controller 102, 104 operates in monitoring mode and the other I/O controller operates in active mode. The monitoring I/O controller switches to active mode upon detecting that the active controller failed. Thus, the I/O subsystem 100 protects against the failure of one of the I/O controllers 102, 104 in both active-active mode and active-passive mode.

The storage devices 108 may be dual ported, that is, include two independent communication paths with one communications path directly coupled to one I/O controller and the other communications path directly coupled to the other I/O controller. For example, the dual ported storage device may be a dual-ported SAS hard disk drive that allows a single hard disk drive to be simultaneously accessed by two I/O controllers 102, 104.

Figure 2:
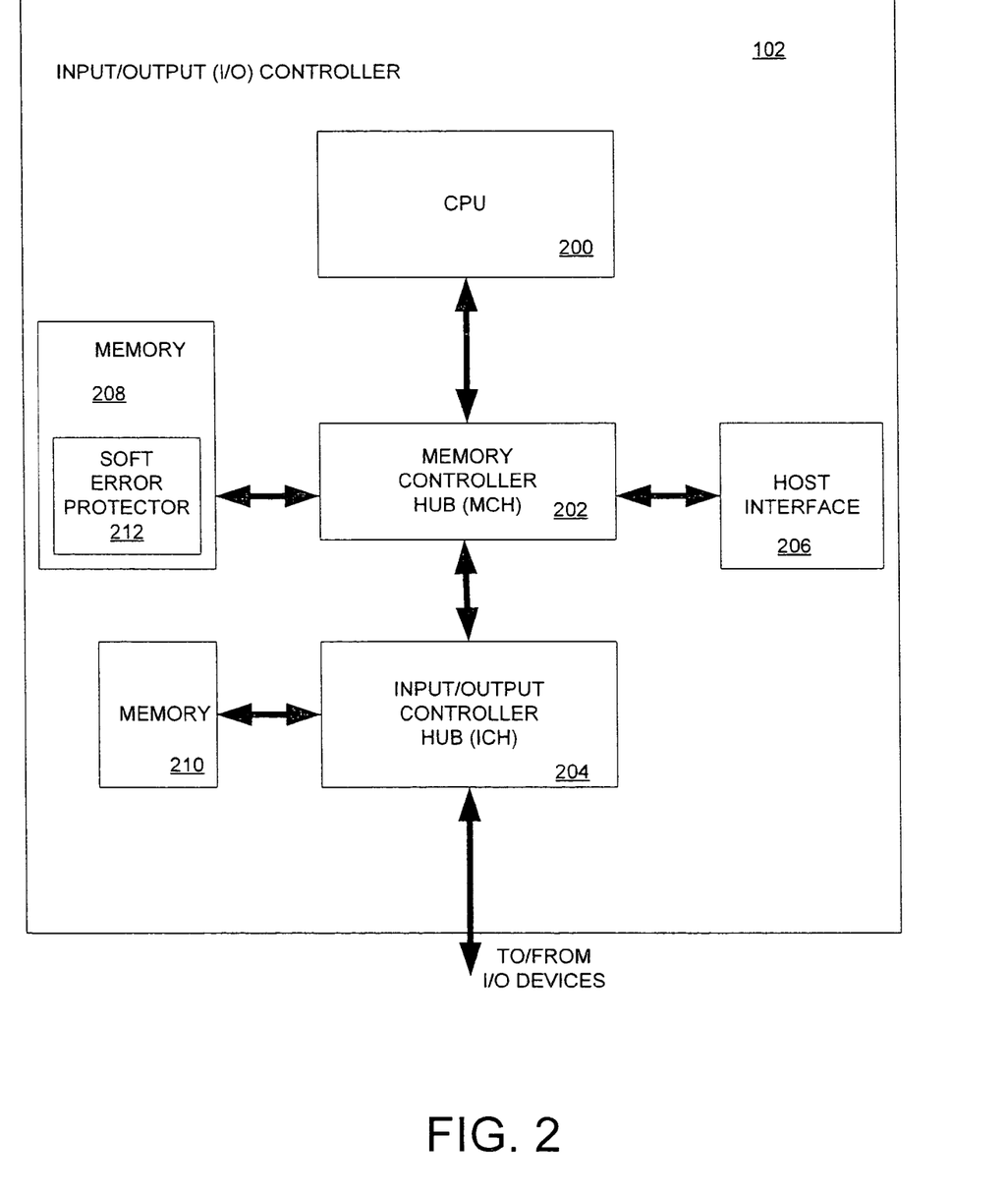
FIG. 2 is a block diagram of an embodiment of one of the I/O controllers shown in FIG. 1.

FIG. 2 is a block diagram of an embodiment of one of the I/O controllers 102 shown in FIG. 1. The I/O controller 102 includes a Central Processing Unit (CPU) 200, a Memory Controller Hub (MCH) 202 and an I/O Controller Hub (ICH) 204. In an embodiment the MCH 202 and ICH 204 may a single component, for example, an Intel 3100® Chipset. The term "chipset" is typically used to refer to an integrated circuit for controlling communication between a microprocessor and other integrated circuits in a computer system. For example, a chipset may control communication between a microprocessor (CPU) 202 and memory 208, 210. In another embodiment, the MCH 202 and ICH 204 may be separate components, for example, an Intel® 82945 MCH and an Intel® 82801 ICH.

The Central Processing Unit (CPU) 200 may be any one of a plurality of processors such as a single core Intel® Pentium IV® processor, a single core Intel Celeron processor, an® XScale processor or a multi-core processor such as Intel® Pentium D, Intel® Xeon® processor, or Intel® Core® Duo processor or other processor.

The memory 208 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 204 may be coupled to the MCH 202 using a high speed chip-to-chip interconnect 214 such as Direct Media Interface (DMI). DMI supports 2 Gigabit/second concurrent transfer rates via two unidirectional lanes. The CPU 200 and MCH 202 communicate over a system bus 216.

An embodiment of a soft error protector 212 stored in memory 208 and accessible by the CPU 200 through the MCH 202 protects against soft errors according to the principles of the present invention. In an active-passive controller configuration, both the active I/O controller and the passive I/O controller receive the same data and instruction set from the host system through the host interface 206 and perform the same data manipulations internally in parallel.

While processing the data, each I/O controller 102, 104 computes a checksum on the data. The simplest form of checksum generator counts all of the bits that are set to '1' in a block of data to produce a checksum. However, this checksum method does not detect reordering of the bytes in the block of data, the insertion or deletion of bits that are set to '0' or multiple bit errors that cancel out each other. Other more sophisticated well-known checksum generators include Fletcher's checksum, Adler032 and Cyclic Redundancy Check (CRC). These checksum generators consider the value of each bit and its position in the block of data and are useful in detecting accidental modification such as corruption.

The checksum provided by a CRC checksum generator is the remainder of a binary division by a predefined bit stream of length n, which represents the coefficients of a polynomial. For example, CRC-32 has a polynomial length of 33 bits with coefficients "x32+x26+x23+x22+x16+x12+x11+x8+x7+x5+x4+x+1".

Figure 3:
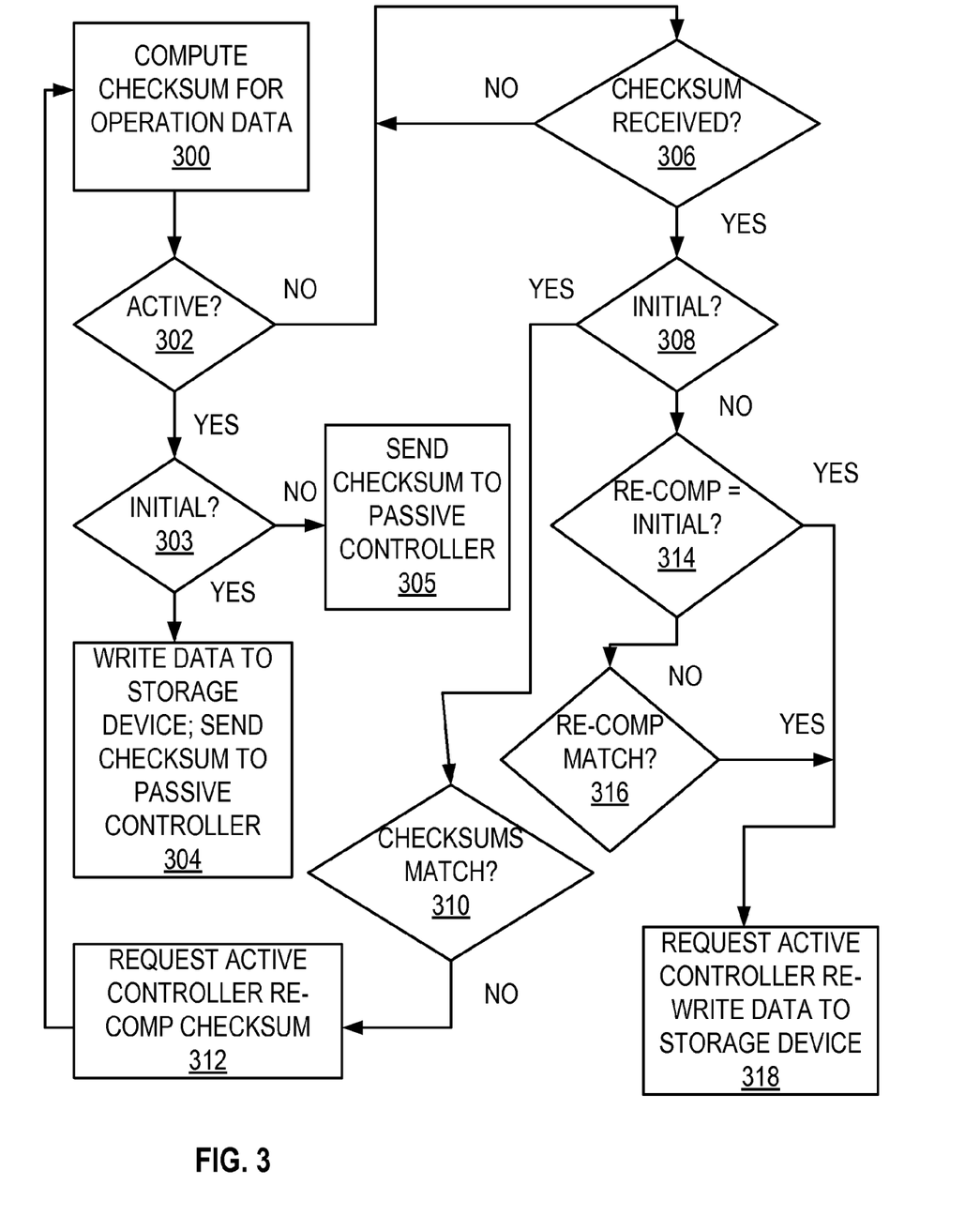
FIG. 3 is a flowchart of an embodiment of a method for protecting against soft errors according to the principles of the present invention that may be used in the storage subsystem shown in FIG. 1.

FIG. 3 is a flowchart of an embodiment of a soft error protector 212 for protecting against soft errors according to the principles of the present invention that may be used in the I/O subsystem 100 shown in FIG. 1.

At block 300, each I/O controller 102, 104 in the I/O subsystem 100 receives the same data and instruction set from the host system and performs the same data manipulations in parallel. Each I/O controller 102, 104 also generates a checksum for the data to be written to the storage device(s) 108 for the particular operation. For example, the I/O controller 102, 104 may perform a checksum for the data in a RAID 5 parity stripe write operation. Processing continues with block 302.

At block 302, the soft error protector 212 determines if the I/O controller is in "active" or "passive" mode. If the I/O controller is in "active" mode, processing continues with block 303. If the I/O controller is in "passive" mode, processing continues with block 306.

At block 303, the "active" I/O controller checks if it is the first time that a checksum is being generated for this operation. If so, processing continues with block 304. If not, processing continues with block 305.

At block 304, as this is the first time that the checksum is being generated for this operation, the "active" I/O controller writes the data for the operation to the storage device 108 and transmits the generated checksum for the operation over the direct dedicated communications link 112 to the "passive" I/O controller.

At block 305, as this is the second time that the checksum is being generated for the current operation, the data has already been written to the storage device. The active I/O controller re-computes the checksum and transmits the re-computed checksum for the current operation over the direct communications link 112 to the passive I/O controller.

At block 306, the "passive" I/O controller waits for the active I/O controller to send the generated checksum. Upon receiving the generated checksum from the "active" I/O controller, processing continues with block 308.

At block 308, the passive I/O controller checks if it is the initial (first) checksum computed for the operation. If so, processing continues with block 310. If not, processing continues with block 314.

At block 310, the passive I/O controller compares the checksum that it generated with the checksum that was received from the active I/O controller. If there is a mismatch between the checksums, there may be a soft error in the data that has been written to the storage device. Processing continues with block 312.

At block 312, the passive I/O controller issues a request over the dedicated link to the active I/O controller to perform the specified operation again. At the same time, the passive I/O controller also performs the operation and re-calculates the checksum. Processing continues with block 300 to perform the operation.

At block 314, the passive I/O controller compares the re-generated checksum generated by the passive I/O controller with the initial checksum generated by the active I/O controller. If there is a match, the active I/O controller is permitted to continue operating. However, if the passive I/O controller determines that the original checksum computed by the active I/O controller does not match the re-computed checksum, processing continues with block 316.

At block 316, the re-computed checksum generated by the passive I/O controller is compared with the re-computed checksum generated by the active I/O controller. If there is a match, processing continues with block 318.

At block 318, the passive I/O controller issues a request over the dedicated link to the active I/O controller to write the new data set based on the second set of calculations because there was a soft error in the first set of data.

In the active-passive embodiment, as the passive I/O controller does not write data to the storage devices, it does not need to have access to the storage devices. In this embodiment, the passive I/O controller only needs to be able to directly communicate with the active I/O controller and to receive the same data from the host system. However, in an active-active embodiment, a passive monitoring I/O controller may be connected to the storage devices. In the active-active embodiment, the passive monitoring I/O controller may work independently on another set of data or it may directly be responsible for correcting errors that it detects by writing the correct results to the storage devices.

The soft error protector 212 discussed in conjunction with FIG. 3 only protects against soft errors that occur in an I/O controller 102, 104. A hard disk drive (also referred to as a hard disk) is a device that includes at least one inflexible platter coated with material in which data can be recorded magnetically. The platters are stored in a hard disk drive enclosure together with read/write heads, a head positioning mechanism and a spindle motor. In addition to the soft errors that may occur in an I/O controller, soft errors may occur during data transit from the active I/O controller to the platter.

There are several low level mechanisms to protect against soft errors in transit, such as Error Correction Code (ECC). ECC involves the addition of a plurality of checkbits to each byte of data that allows detection of multiple bit errors and detection and correction of single bit errors. ECC is typically used in the drive connection interface and within the hard disk drive electronics. However, in most commodity hard disk drive implementations, these mechanisms do not communicate with each other and there may be points along the data path that are not protected.

For example Serial ATA (SATA) provides for ECC while data is traveling the physical connection from the active I/O controller to the hard disk drive, but does not provide any protection while data moves from input memory buffers in the hard disk drive to the platter in the hard disk drive, where it is converted from an electrical signal to a magnetic state.

Figure 4:
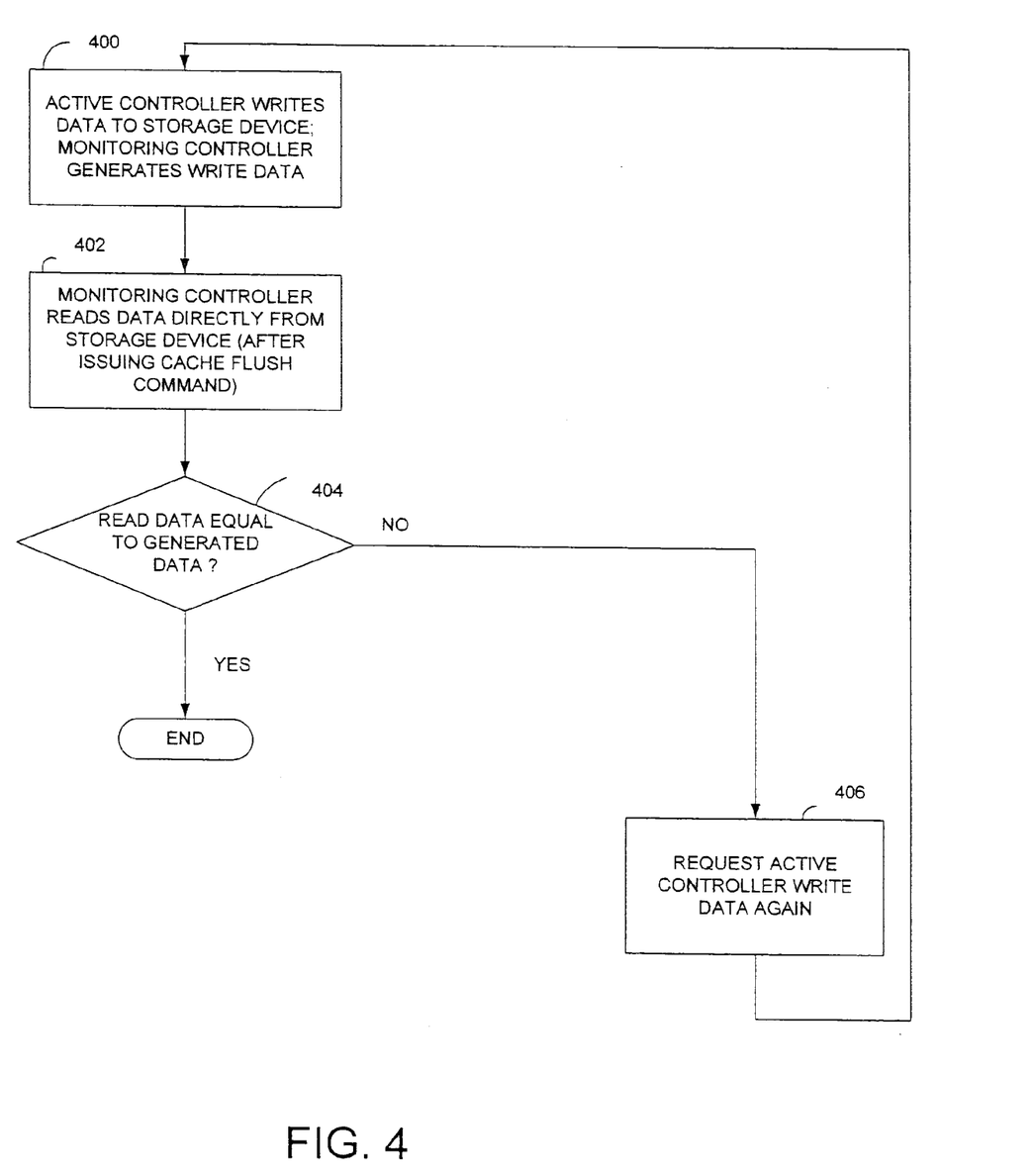
FIG. 4 is a flowchart of another embodiment of a soft error protector for protecting against soft errors according to the principles of the present invention that may be used in the I/O subsystem shown in FIG. 1.

FIG. 4 is a flowchart of another embodiment of a method for protection against soft errors. This embodiment protects against errors that may occur during data transit from the active I/O controller to a storage device that may be used in the storage subsystem 100 shown in FIG. 1.

In an embodiment with SAS hard disk drives, both the active I/O controller and the monitoring I/O controller shown in FIG. 1 communicate directly with the hard disk drives 108 through dual ports on SAS hard disk drives.

At block 400, the active I/O controller writes data to the hard disk drive while the monitoring I/O controller generates the same data that is written to the hard disk drives by the active I/O controller. Processing continues with block 402.

At block 402, the monitoring I/O controller reads the data that has been written by the active controller directly from the hard disk drive in order to compare it with the write data that it generated in block 400. Typically, in order to increase I/O performance, a hard disk drive may include cache memory for temporarily storing data prior to writing the data to a platter on the hard disk drive. In this case, a read operation may result in data stored in cache memory being read instead of data being read directly from a platter. Checking that the data read from cache memory matches the written data only ensures that data is being transmitted correctly to cache memory and does not detect a soft error that occurs during transit from the cache memory to the platter on the hard disk drive.

In another embodiment, to ensure that data is read directly from the platter of the hard disk drive, the monitoring I/O controller may issue a command to request that the hard disk drive perform a cache flush. The cache flush is requested prior to issuing a read command to read data from the hard disk drive. A cache flush writes modified entries in the cache to the platter and marks entries. This ensures that when the read is performed, the data is read directly from the platter of the hard disk drive. Processing continues with block 404.

At block 404, the monitoring I/O controller compares the data read from the hard disk drive to ensure that the data that the active I/O controller has written to the hard disk drive is the same as the data that the monitoring I/O controller generated. This addresses a potential issue of soft errors occurring during data transit from the active I/O controller to the platter of the hard disk drive. If there is a match, processing is complete. If not, processing continues with block 406.

At block 406, the monitoring I/O controller requests that the active I/O controller perform the write operation again. Processing continues with block 400.

Although, performing a hard disk drive flush prior to each write operation ensures that the data is read directly from the platter of the hard disk drive, continual cache flushes may impact the I/O performance of the system.

Storage devices that communicate with I/O controllers using the SAS protocol provide external control of cache in the storage device through the use of mode pages which are stored in non-volatile memory in the storage device. Commands to read and write parameters stored in mode pages are defined by SCSI-3 block commands (SBC) which is a T10 standard. T10 is a Technical Committee of the InterNational Committee on Information Technology Standards (INCITS) which operates under rules that are approved by, the American National Standards Institute (ANSI).

A caching mode page defines the parameters that affect the use of the internal cache in a storage device. Parameters in the caching mode page are modified through the use of a SCSI mode select command and are read using the SCSI mode sense command. The caching mode page includes a Read Cache Disable (RCD) bit which when set to '1' specifies that a device retrieve all data requested by a READ command directly from the platter (media). The caching mode page also includes a Writeback Cache Enable (WCE) bit which when set to '0' specifies that a device returns good status for a write command only after successfully writing all the data to the medium, that is, the cache operates in "write-through" mode. Thus, cache in the storage device may be disabled through the use of the caching mode page.

Figure 5:
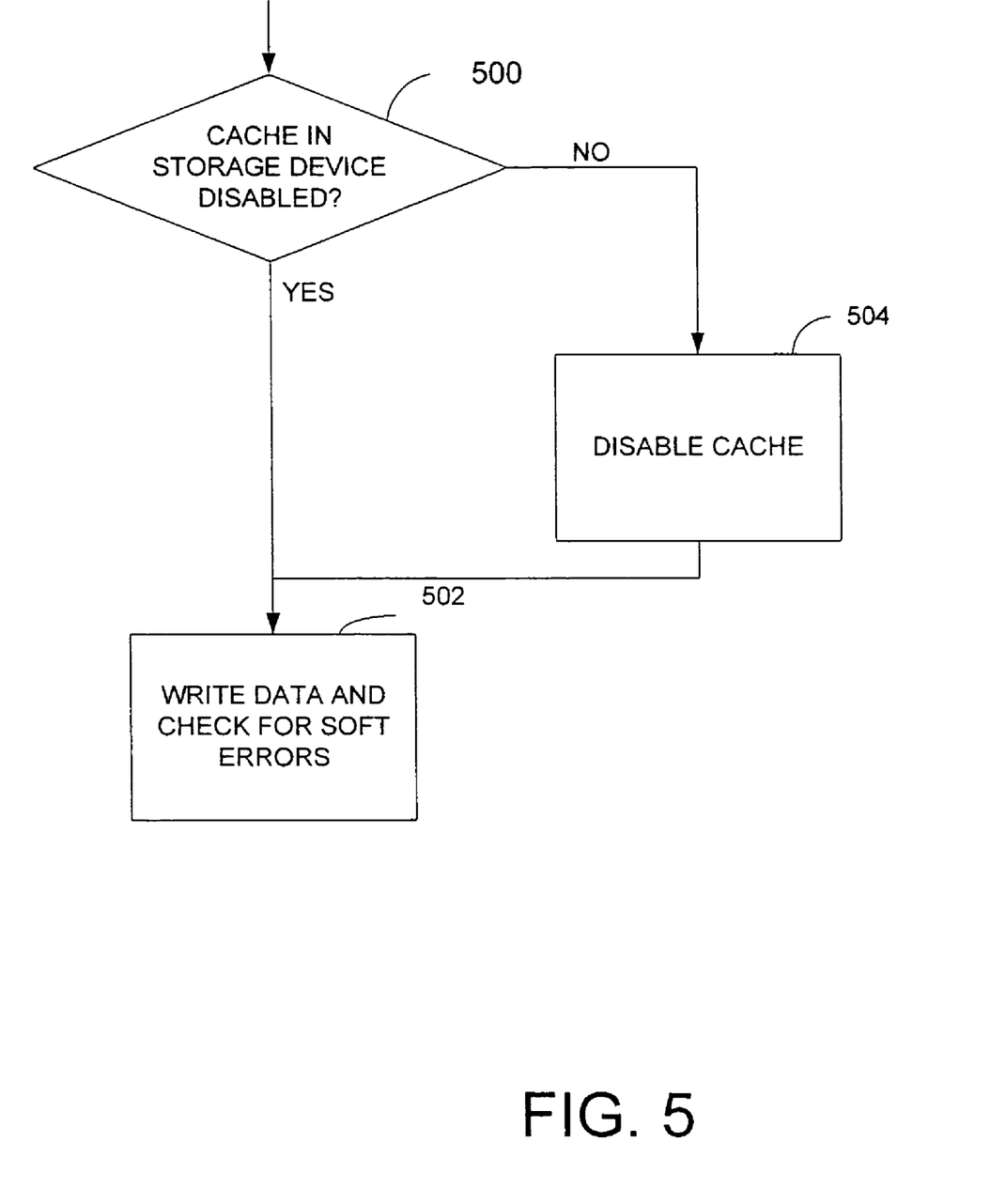
FIG. 5 is a flowchart of yet another embodiment of a soft error protector for protecting against soft errors according to the principles of the present invention that may be used in the I/O subsystem shown in FIG. 1.

FIG. 5 is a flowchart of yet another embodiment of a method for protecting against soft errors that may be implemented in the system shown in FIG. 1.

At block 500, each hard disk drive 108 in the pool of storage devices 106 is monitored to ensure that read and write caches are disabled. For example, each hard disk drive may be monitored using round robin scheduling to check each hard disk drive. In an embodiment in which the disk drive is accessed using the SCSI protocol, the state of the RCD bit and the WCE bit in the respective caching mode page are monitored using the SCSI mode sense command. If the cache is disabled, processing continues with block 502. If not, processing continues with block 504.

At block 504, as cache is disabled, a write request is processed as discussed in conjunction with FIG. 4. However, a cache flush command is not issued as the cache is already disabled.

At block 506, cache is disabled, for example, in an embodiment in which a hard disk drive is accessed using the SCSI protocol, a SCSI mode select command is issued to the hard disk drive to disable the write and read cache. Processing continues with block 504.

The embodiment discussed in conjunction with FIG. 5 has less performance impact than the embodiment discussed in conjunction with FIG. 4 that continuously performs cache flushes. If a discrepancy (mismatch) is detected using the embodiment discussed in conjunction with FIG. 5, the error is corrected in the same way as previously discussed in conjunction with FIG. 3.

The soft error detection and correction embodiments discussed in conjunction with FIGS. 3-5 may be used in other embodiments of storage systems which will be discussed in conjunction with FIGS. 6-8.

Figure 6:
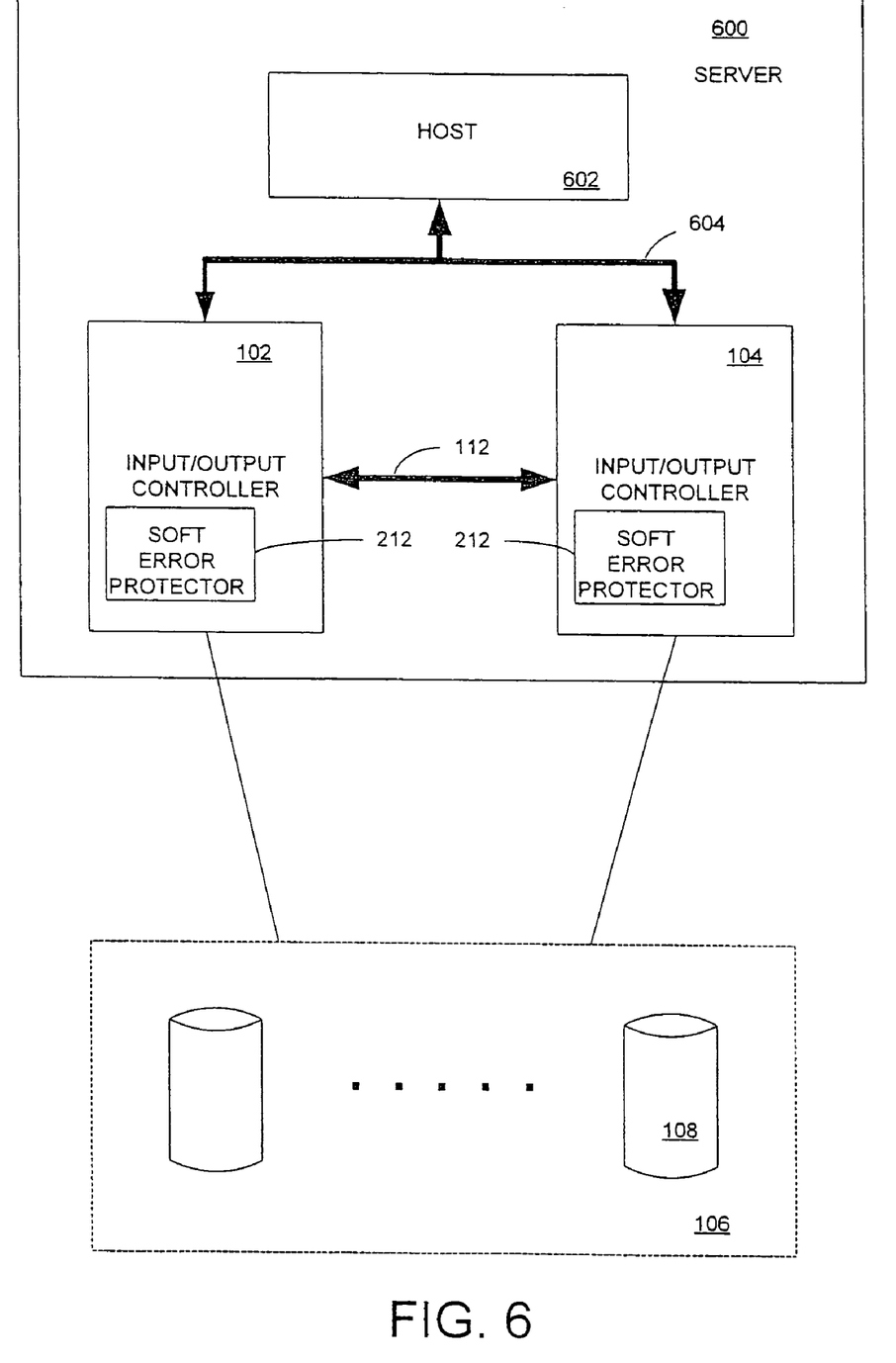
FIG. 6 is a block diagram of an embodiment of a system that includes a soft error protector.

FIG. 6 is a block diagram of a hardware topology that includes a single server 600 with a single host 602 and two I/O controllers 102, 104. The server 600 is coupled to a shared pool of storage devices 106. A server is a computer or software application that responds to commands from clients. For example, a file server transfers a copy of a file in response to a request from a client for the file.

The I/O controllers 102, 104 may communicate with the host 602 over a Peripheral Component Interconnect Extended (PCI-X) or Peripheral Component Interconnect Express (PCI-E) interface 604. The monitoring I/O controller does not need to be connected to the pool of storage devices 106 if the protection against soft errors is performed using the embodiment discussed in conjunction with FIG. 3. However, for the embodiments discussed in conjunction with FIGS. 4-5, the monitoring I/O controller is coupled to the pool of storage devices 106. Each I/O controller 102, 104 includes a soft error protector 212 to perform soft error detection and correction.

Also, by allowing the monitoring I/O controller to access the pool of storage devices 106, the monitoring I/O controller may serve as a passive redundant I/O controller that may assume the functions of the primary I/O controller if the primary I/O controller fails, offering an active/passive failover scheme within the server 600 as well as providing support for soft error detection and correction.

Figure 7:
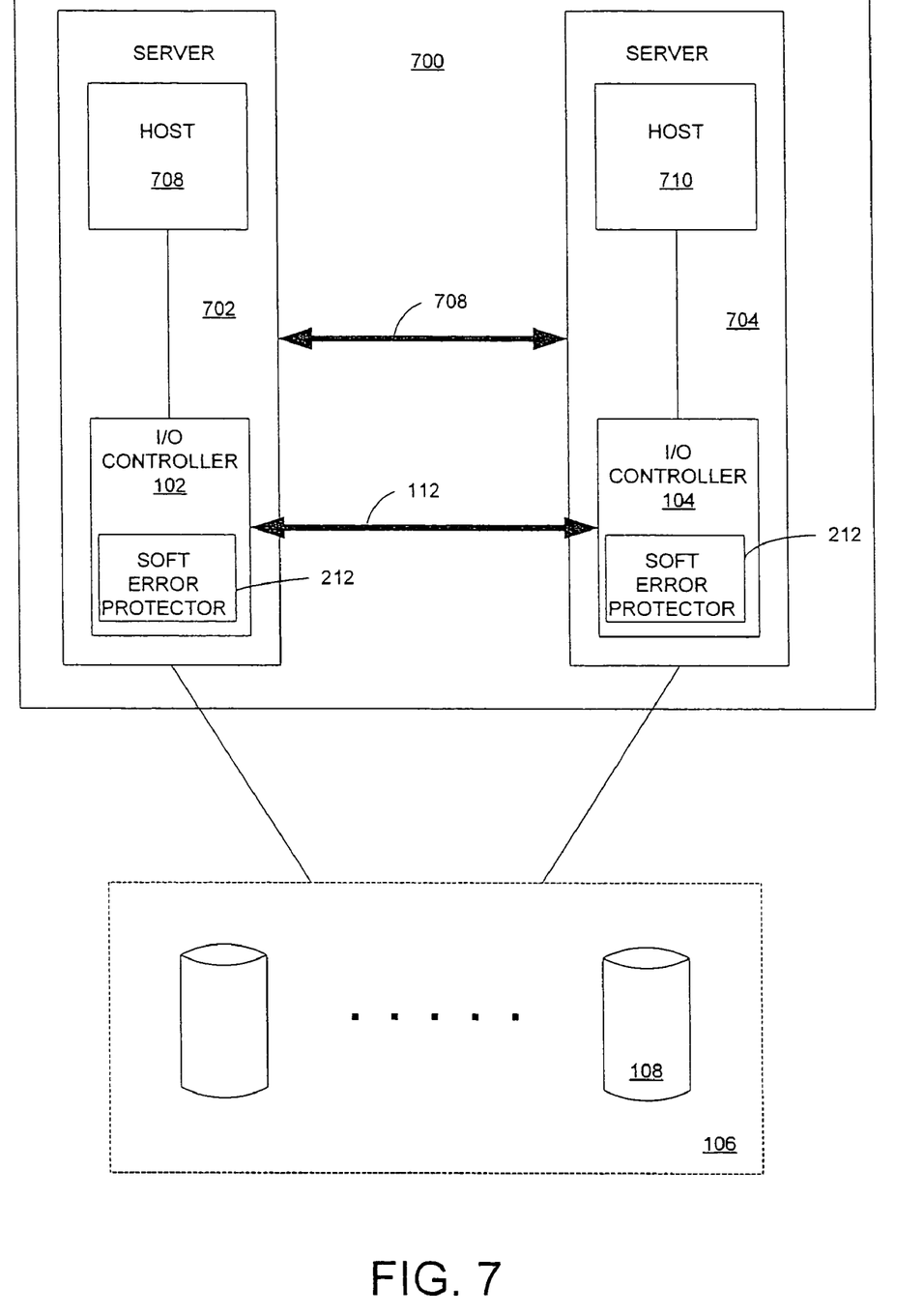
FIG. 7 is a block diagram of another embodiment of a system that includes a soft error protector.

FIG. 7 is a block diagram of a system 700 that includes two independent server cards 702, 704. A card is a printed circuit board or adapter that can be plugged into a computer to provide added functionality or new capability. A server is a computer that controls access to resources such as disk drives. In the embodiment shown, the server cards 702, 704 are plugged into a single chassis of the system 700. Each server card 702, 704 includes a respective I/O controller 102, 104 and a respective host system 708, 710. Each host system 708, 710 includes a Central Processing Unit (CPU) and memory. Each I/O controller 102, 104 is connected to a shared pool of storage devices 106. In an embodiment, the shared pool of storage devices 106 may be in a separate external chassis (enclosure). In an embodiment in which each hard disk drive 108 in the shared pool of storage devices 106 includes a SAS interface, the pool of hard disk drives 106 may be located within the same chassis as the servers 702, 704. The I/O controllers 102, 104 may communicate directly with each other over an inter-controller communications link 112. Also, the servers 702, 704 are clustered, that is, grouped in a way that allows them to appear to be a single unit to client computers on a network. Clustering increases network capacity and provides redundancy if one of the servers fails. The servers 702, 704 also have a direct connection through server dedicated link 708 to each other. In the embodiment shown, both the inter-controller communications link 112 and the server dedicated link 708 are in the single chassis and thus do not require external cabling. Furthermore, a single link to the system 700 may be used to manage not only the server clustering but also the direct communication between the I/O controllers 102, 104. Each I/O controller 102, 104 includes a soft error protector 212 to perform soft error detection and correction. The system shown in FIG. 6 may use any of the soft error detection and correction embodiments described in conjunction with FIGS. 3-5 for soft error detection and correction.

In another embodiment, instead of a separate dedicated inter-controller communications path 706, communications between the I/O controllers may be provided through an operating system driver that provides a message passing infrastructure in the host system's memory.

For example, the I/O controllers may be installed in a server running an operating system such as Microsoft® Windows, Linux or any other operating system. The operating system includes a device driver to control the I/O controller.

The same device driver controls both the active and the monitoring controller. The device driver has a shared memory/buffer area that allows data to be shared among the two I/O controllers. When an operation is complete, a checksum, or the data itself can be stored in the shared memory/buffer area so that the monitoring I/O controller can read that data to compare against the data that it generated for the same operation.

Figure 8:
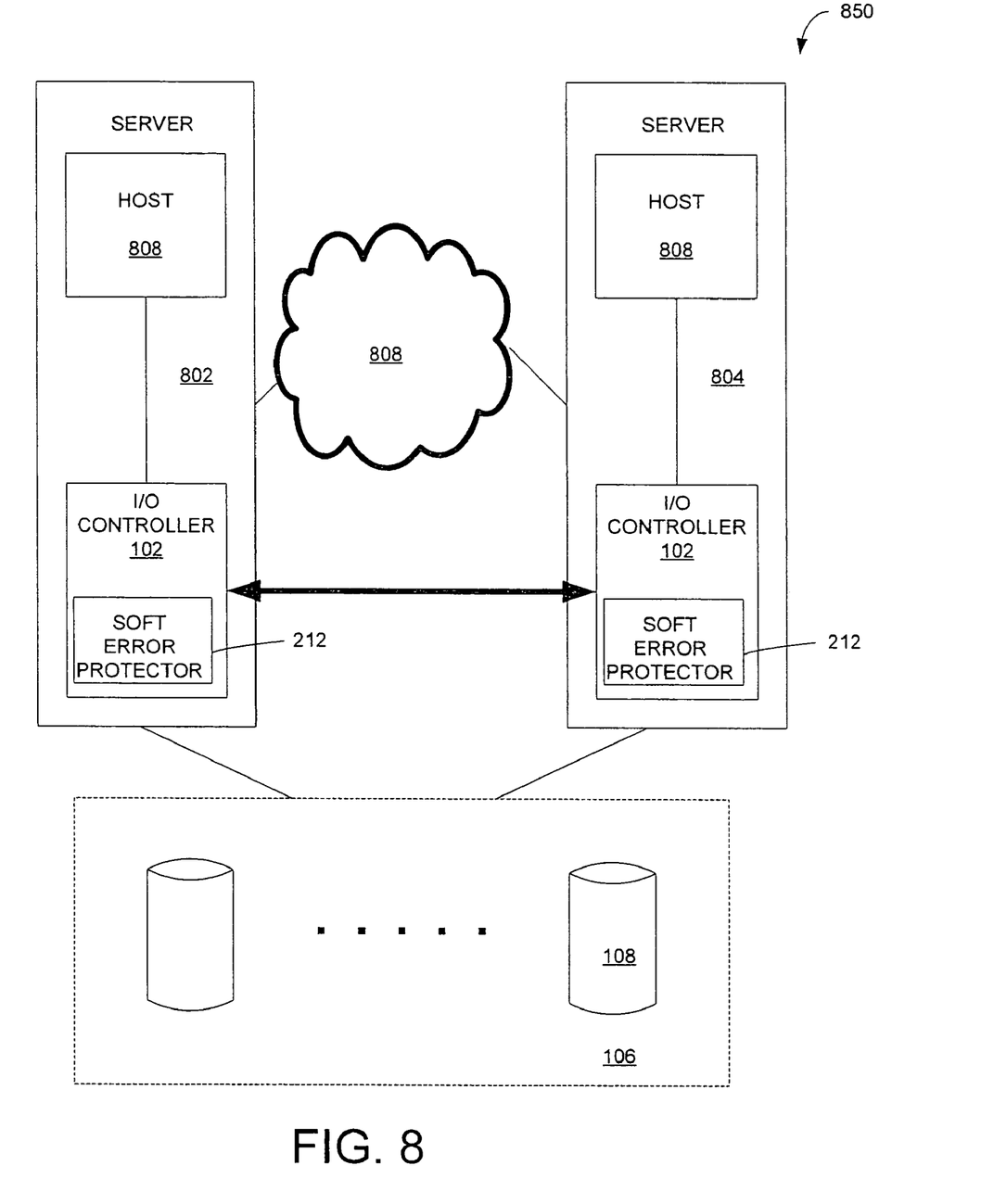
FIG. 8 is a block diagram of yet another embodiment of a system that includes a soft error protector.

FIG. 8 is a block diagram of a system 850 including two physically separate server computers 802, 804. Each server computer 804, 806 includes a respective I/O controller 102, 104 and each I/O controller 102, 104 is coupled to a shared pool of hard disk drives 106. The system 805 shown in FIG. 8 protects against hardware failures by allowing multiple I/O controllers to access the shared pool of hard disk drives.

The server computers 802, 804 communicate over a communications network 808 using a communications protocol such as Ethernet. Each I/O controller 102, 104 includes a soft error protector 212 to perform soft error detection and correction. The system 850 shown in FIG. 8 may use any of the soft error detection and correction embodiments described in conjunction with FIGS. 3-5 for soft error detection and correction.

Implementing any of the methods for protecting against soft errors discussed in conjunction with FIGS. 3-5 together with either clustering or active/passive failover and RAID allows for new hardware topologies based on standard commodity building blocks—specifically, hardware topologies shown in FIGS. 7 and 8.

Guaranteeing the integrity of data stored on storage devices is extremely important for some types of data, for example, financial data. The added check for soft errors provides an additional level of confidence that the stored data is correct. The level of robustness required for a particular application is selectable based on the method selected for checking for soft errors. For example, the embodiment discussed in conjunction with FIG. 3 has the smallest performance hit but requires the use of a checksum scheme, the embodiments discussed in conjunction with FIGS. 4 and 5 are easier to implement but impact performance to a much greater degree, with the embodiment discussed in conjunction with FIG. 4 having the greatest performance impact due to cache flushing.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a first controller to couple to a storage device and to receive from a host first write data for a write operation to a storage device, the first controller also being to issue to the storage device the first write data in the write operation; and
a second controller to couple to the storage device and to receive from the host second write data that is a copy of the first write data, the second controller comprising:
a communications interface to communicate with the first controller; and
an error protector to determine if the first write data as issued by the first controller to the storage device in the write operation includes a soft error, the error protector in the second controller determining whether the soft error is included in the first write data as issued by the first controller to the storage device by comparing first data with second data, the first data being based on the first write data issued by the first controller to the storage device in the write operation, the second data being generated by the error protector in the second controller based on the second write data, and if the error detector determines that the soft error is included in the first write data as issued by the first controller to the storage device, the second controller being to (1) issue to the first controller a request that the first controller receive again the first write data from the host and that the first controller perform again the write operation, and (2) re-generate the second data.

2. The apparatus of claim 1, wherein the first data is a first checksum computed for the first write data and the second data is a second checksum computed for the second write data.

3. The apparatus of claim 2, wherein the checksum is computed using a Cyclic Redundancy Check algorithm.

4. The apparatus of claim 2, wherein the first checksum is transmitted over the communications interface from the first controller to the second controller.

5. The apparatus of claim 1, wherein the first data is the first write data and the second data is the second write data.

6. The apparatus of claim 5, wherein the error protector issues a command to flush cache in the storage device prior to reading the first data from the storage device.

7. The apparatus of claim 5, wherein the error protector ensures that the cache in the storage device is disabled prior to issuing a write command to perform the write operation in the storage device.

8. The apparatus of claim 1, wherein the second controller and the first controller are in a storage subsystem.

9. The apparatus of claim 1, wherein the second controller is included in a first server card and the first controller is included in a second server card.

10. The apparatus of claim 1, wherein the second controller is included in a first server and the first controller is included in a second server, the first and second server capable of communicating over a communications network.

11. A method comprising:
generating, by a first controller, a first write data for a write operation, the first write data being previously received by the first controller from a host;
concurrently generating, by a second controller, a second write data for a same write operation, the second write data being previously received by the second controller from the host;
forwarding, by the first controller, the first write data to a storage device; and
determining by the second controller if the first write data has a soft error by comparing a first data based on the first write data with a second data based on the second write data;
the first data being generated based on the first write data, the second data being generated by the second controller based on the second write data, and if the second controller determines that the soft error is included in the first write data, the second controller being to (1) issue to the first controller a request that the first controller receive again the first write data from the host and that the first controller perform again the write operation, and (2) re-generate the second data.

12. The method of claim 11, wherein the first data is a first checksum computed for the first write data and the second data is a second checksum computed for the second write data.

13. The method of claim 12, wherein the checksum is computed using a Cyclic Redundancy Check algorithm.

14. The method of claim 12, wherein the first checksum is transmitted over a communications interface from the first controller to the second controller.

15. The method of claim 11, wherein the first data is first write data generated by the first controller that is written to and read from the storage device and the second data is the second write data.

16. The method of claim 15, wherein the second controller issues a command to flush cache in the storage device prior to reading the first data from the storage device.

17. The method of claim 15, wherein the second controller ensures that the cache in the storage device is disabled prior to issuing a write command to the storage device.

18. The method of claim 11, wherein the second controller and the first controller are in a storage subsystem.

19. The method of claim 1, wherein the second controller is included in a first server card and the first controller is included in a second server card.

20. The method of claim 1, wherein the second controller is included in a first server and the first controller is included in a second server, the first and second server capable of communicating over a communications network.

21. An article including a machine-accessible medium having associated information,
wherein the information, when accessed, results in a machine performing:
generating, by a first controller, a first write data for a write operation, the first write data being previously received from a host;
concurrently generating, by a second controller, a second write data for a same write operation, the second write data being previously received from the host;
forwarding, by the first controller, the first write data to a storage device; and
determining by the second controller if a soft error is in the first write data by comparing a first data based on the first write data with a second data based on the second write data;
the first data being generated based on the first write data, the second data being generated by the second controller based on the second write data, and if the second controller determines that the soft error is included in the first write data, the second controller being to (1) issue to the first controller a request that the first controller receive again the first write data from the host and that the first controller perform again the write operation, and (2) re-generate the second data.

22. The article of claim 21, further comprising:
the first data is a first checksum computed for the first write data and the second data is a second checksum computed for the second write data.

23. A system comprising:
a hard disk drive;
a first controller to couple to the hard disk drive and to receive from a host first write data for a write operation to the hard disk drive, the first controller also being to issue to the hard disk device the first write data in the write operation; and
a second controller to couple to the hard disk drive and to receive from the host second write data that is a copy of the first write data, the second controller comprising:
a communications interface to communicate with the first controller; and
an error protector to detect a soft error in the first write data as issued by the first controller to the hard disk drive in the write operation, the error protector in the second controller determining whether the soft error is included in the first write data as issued by the first controller to the hard disk drive by comparing first data with second data, the first data being based on the first write data issued by the first controller to the storage device in the write operation, the second data being generated by the error protector in the second controller based on the second write data, and if the error detector determines that the soft error is included in the first write data as issued by the first controller to the storage device, the second controller being to (1) issue to the first controller a request that the first controller receive again the first write data from the host and that the first controller perform again the write operation, and (2) re-generate the second data.

24. The system of claim 23, wherein the first data is a first checksum computed for the first write data and the second data is a second checksum computed for the second write data.

* * * * *